No. 855,762. PATENTED JUNE 4, 1907.
E. K. EMIG.
DUMPING WAGON.
APPLICATION FILED FEB. 27, 1907.
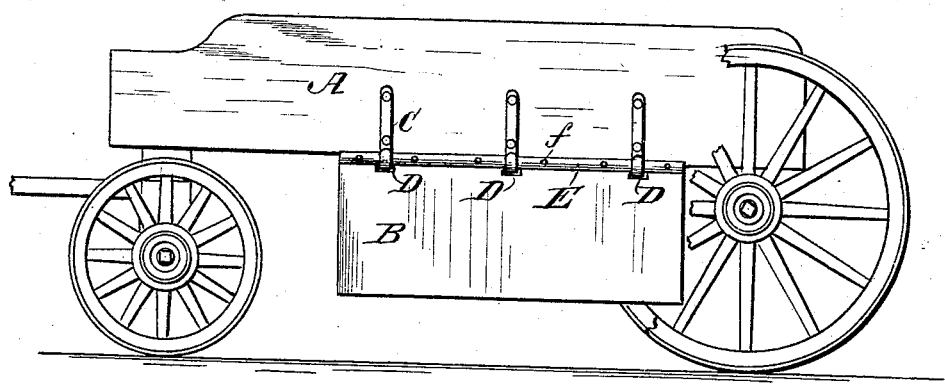
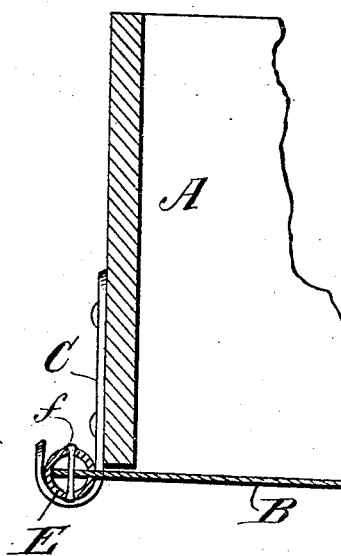
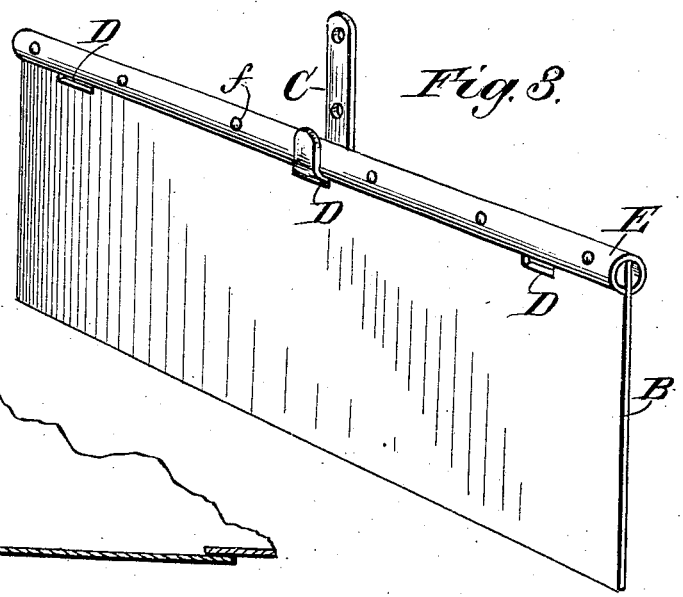
Witnesses.
Inventor.
Edward K. Emig

UNITED STATES PATENT OFFICE.

EDWARD K. EMIG, OF EMIGSVILLE, PENNSYLVANIA.

DUMPING-WAGON.

No. 855,762.     Specification of Letters Patent.     Patented June 4, 1907.

Application filed February 27, 1907. Serial No. 359,617.

*To all whom it may concern:*

Be it known that I, EDWARD K. EMIG, of Emigsville, county of York, State of Pennsylvania, have invented a new and useful Improvement in Dumping-Wagons, of which the following is a specification.

My invention has to do with that kind of dumping wagon in which the bottom of the wagon box is closed by doors hinged at their outer edges to the sides of the box, so as to permit them to swing downwardly and outwardly in discharging the load.

My invention has reference to the hinge which connects the door to the wagon box, and to the means for reinforcing and stiffening the door along its outer edge to prevent it from buckling or sagging under the weight of the load. The hinge I make use of is of the hook and eye type—the hook being on the wagon box and the eye on the door.

Under my invention the eye is punched through the door itself, and the outer edge of the door is reinforced by a longitudinal stiffening tube which adjoins the eye, and which, when the hook is passed through the eye, is partly encircled by said hook in which it seats itself and takes its bearing.

In the accompanying drawing—Figure 1 is a side elevation of so much of a dumping wagon as needed to illustrate my invention—the door being shown in open position. Fig. 2 is a cross section of a portion of one side of the wagon box, and of the door which is hinged to it. Fig. 3 is a perspective view of a door and one of the hooks—the hook being passed through the eye in the door.

I have shown only so much of the wagon as concerns my improvement, and have omitted the means for raising the doors and keeping them closed, which means may be of any approved type.

A represents the wagon box; B one of the doors; C the hook members of the hinge bolted or otherwise suitably secured by their shanks to the sides of the wagon box; D the eye members of the hinge, punched through the door itself adjoining its outer edge; and E the stiffening tube, which in the present instance is formed of a longitudinally split tube, fitting upon and clasping tightly between its longitudinal opposed edges the strip of metal of which the door is composed, which intervenes between the eyes D and the outer edge.

In the present instance there are three hooks at desired intervals apart; and there is, of course, a corresponding number of correspondingly spaced eyes in the door. The door where it adjoins the tube is radial to the latter; and the bend of the hooks has a curvature corresponding to that of the tube, so that when the hooks are passed through the eyes, they will at their bends pass around the tube, making therewith a loose comfortable fit, furnishing a bearing in which the reinforcing tube can turn somewhat as a hinge pin would turn.

The stiffening tube E which borders the outer edge of the door, can be formed and applied and secured thereto in any suitable manner. I prefer the arrangement shown in the drawing, in which the outer edge of the door is inserted between the jaws of a split tube and extends diametrically through and across the tube to the other side. The tube can be secured in this position by closing it tightly upon the inserted edge of the door and riveting through the tube and the portion of the door, as indicated at *f*, or in any other desired way.

The eyes are formed in this instance as oblong holes to receive hooks made of metal straps correspondingly shaped in cross section, and they immediately adjoin the stiffening or reinforcing tube.

Having described my improvement and the best way now known to me of carrying the same into practical effect what I claim and desire to secure by Letters Patent is—

1. In a dumping wagon, a bottom door, a longitudinal reinforcing tube secured to and bounding the outer edge of the door, eyes formed in the door at points immediately adjoining the reinforcing tube, and hooks secured to the wagon box, engaging the eyes, having their bends curved substantially concentrically with the reinforcing tube, substantially as and for the purposes hereinbefore set forth.

2. The door, the split tube bordering the outer edge of the door, and clasping the inserted portion of said door, and the eyes formed in the door at points immediately adjacent to the tube, in combination with the wagon box, and hooks upon the sides of the box, to engage said eyes, substantially as and for the purposes hereinbefore set forth.

In testimony whereof I affix my signature in presence of two witnesses.

EDWARD K. EMIG.

Witnesses:
CHAS. S. HYER,
W. LEE HELMS.